April 19, 1960   R. L. MIKELL   2,932,979
SPIN FREE REACH ROD ASSEMBLY
Filed Sept. 6, 1956
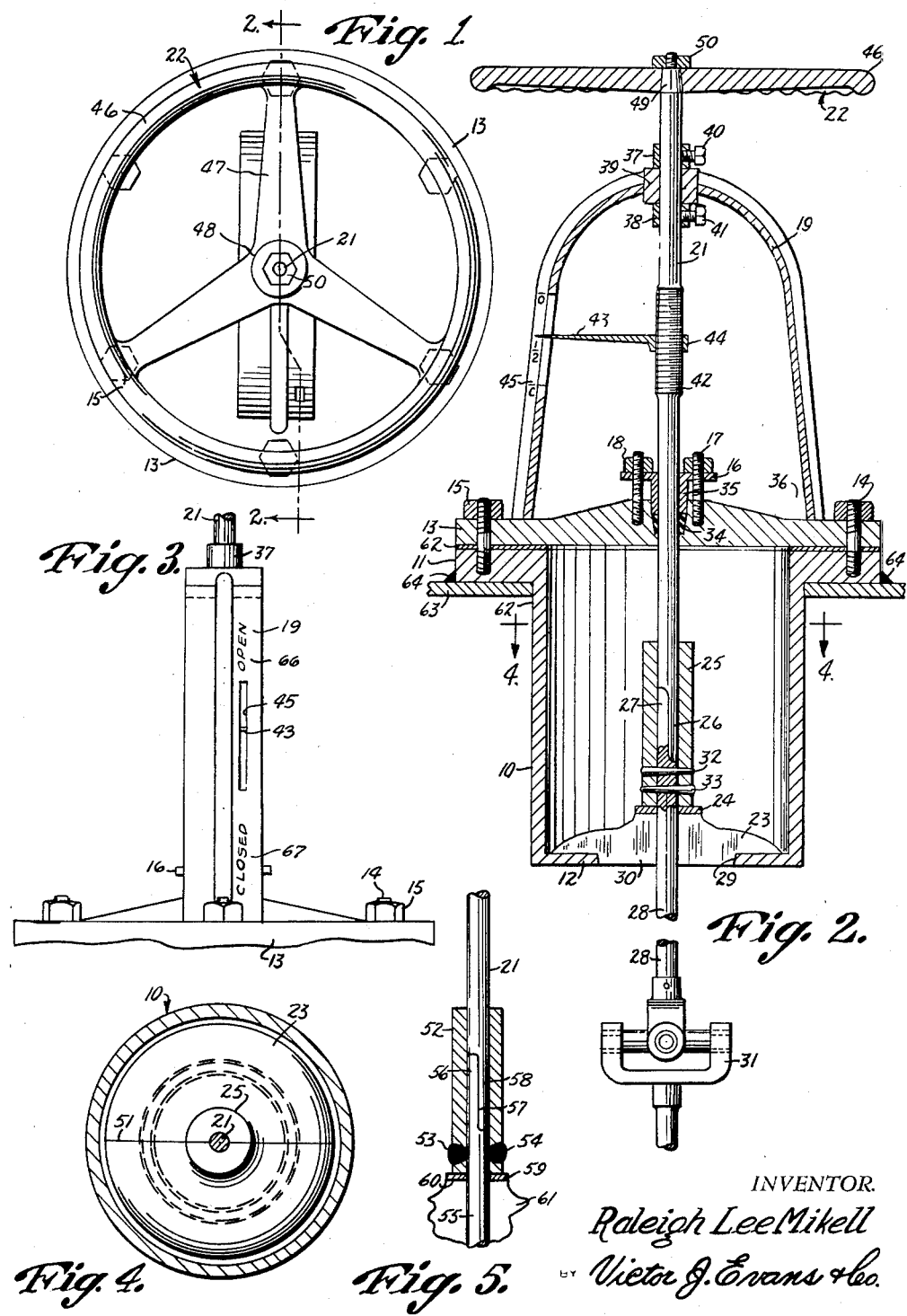
INVENTOR.
Raleigh Lee Mikell
BY Victor J. Evans & Co.
ATTORNEYS United States Patent Office 2,932,979
Patented Apr. 19, 1960

2,932,979

SPIN FREE REACH ROD ASSEMBLY

Raleigh Lee Mikell, Savannah, Ga.

Application September 6, 1956, Serial No. 608,285

2 Claims. (Cl. 74—504)

This invention relates to extensions for valve rods or stems to facilitate opening and closing valves from remote points, such as in a hold or tank of a ship wherein it is desired to open and close a valve from the deck, and in particular a housing having a flange extended from the upper edge and adapted to be secured to the deck of a ship with the housing extended through an opening in the deck whereby with a rod extended through a thrust bearing and washer in the lower end of the housing, through a packing gland in a cover positioned on the flange and through an opening in the upper end of a support removably mounted on the cover the shaft may be rotated by a hand wheel on the upper end to turn the valve stem for opening and closing the valve.

The purpose of this invention is to provide a reach rod or extension for a valve stem that is designed to extend through a mounting housing positioned in an opening in a deck of a ship whereby a valve may be actuated with the possibility of leakage around the valve stem or rod eliminated.

With conventional valve operating devices particularly of this type it is necessary to operate the valve from the inside of a tank and valve stems or other extension elements are, necessarily, removed from the inside of the tank. This practice is not only dangerous because of certain fumes and the like but requires material and labor, both of which are costly on a ship. With this thought in mind this invention contemplates a housing having a thrust bearing and washer in the lower end, a cover plate mounted on the upper end, a support mounted on the cover plate, and a rod having a coupling element on the lower end and a hand reel on the upper end rotatably mounted in bearings in the parts and adapted to be readily removed with the cover plate and support.

The object of this invention is, therefore, to provide means for attaching an extension to a valve stem or the like to facilitate operating the valve from a remote point in which the possibility of leakage through the mounting elements is substantially eliminated.

Another object of the invention is to provide a bearing mounting for an extension rod of a valve stem, particularly of the type used in the hold or in a tank in the hold of a ship in which the device is adapted to be installed on decks of ships now in use.

A further object of the invention is to provide an improved valve extension and mounting therefor in which the device is of a simple and economical construction.

With these and other objects and advantages in view the invention embodies a housing having an inwardly extended annular flange in the lower end and an outwardly extended flange on the upper end, a cover plate secured by studs and nuts on the flange extended outwardly from the upper end of the housing, a support removably mounted on the cover plate, an extension shaft rotatably mounted in the cover plate and support and in which the lower end extends into a coupling sleeve and a hand wheel positioned on the upper end of the shaft.

Other features and advantages of the invention will appear from the following description taken in connection with the drawing, wherein:

Figure 1 is a plan view of the improved reach rod assembly.

Figure 2 is a vertical section through the assembly taken on line 2—2 of Fig. 1 showing a universal joint depending from the lower end.

Figure 3 is a front elevational view of a support through which the valve operating shaft extends.

Figure 4 is a sectional plan through the housing below the deck of a ship taken on line 4—4 of Fig. 2 showing the split thrust washer and bearing in the lower end thereof.

Figure 5 is a vertical section through the coupling showing a modification wherein the coupling sleeve is connected to the rod extended through the thrust washer by welding.

Referring now to the drawing wherein like reference characters denote corresponding parts the improved reach rod assembly of this invention includes a housing 10 having a flange 11 on the upper end and an inwardly extended flange 12 on the lower edge, a cover plate 13 secured to the flange 11 with studs 14 and nuts 15, a packing gland 16 secured in the cover plate with studs 17 and nuts 18, a support 19 having an opening 20 in the upper end through which a rod 21 extends, a hand wheel 22 on the upper end of the rod, a thrust washer 23 mounted by a split washer 24 on the flange 12 in the lower end of the housing, and a coupling 25 positioned on the thrust washer and in which a tongue 26 on the lower end of the rod 21 is positioned whereby the tongue 26 coacts with a tongue 27 extended upwardly from a valve stem 28 extended from the lower end of the assembly.

The flange 12 in the lower end of the housing 10 is provided with an opening 29 in which a shoulder 30 of the thrust washer 24 is positioned and, as shown in Fig. 2, the opening 29 is of sufficient diameter to permit a universal joint 31 of the shaft 28 to be withdrawn through the housing.

The stem 28 is secured in the coupling 25 with taper pins 32 and 33 whereby the rod rotates with the coupling and with the rod secured in the coupling the lower end of the rod 21 is adapted to be operatively inserted in the coupling and also readily removed therefrom.

The cover plate 13 is provided with an annular recess, 34 into which a sleeve 35 of the packing gland 16 extends, and with the parts assembled as shown in Fig. 2 the nuts 18 may be turned to force packing in the recess 34 downwardly compressing the packing to provide a seal. The cover plate 13 provides a base for the support 19 which extends upwardly from the base to a hub 36 in which the opening 20 is positioned at the upper end of the support.

The rod 21 is provided with spaced set collars 37 and 38 which bear against upper and lower surfaces of a hub 39 in the upper end of the support 19 to prevent longitudinal movement of the rod 21 in the opening through the hood. The collar 37 is retained in adjusted position with a set screw 40 and the said collar 38 is retained in position by a similar set screw 41.

The intermediate part of the rod 21 is provided with a threaded section 42 on which a pointer 43 is positioned and with the hub 44 of the pointer threaded internally the pointer moves upwardly and downwardly upon rotation of the rod 21. As shown in Figs. 2 and 3 the pointer or arm 43 extends through a slot 45 in the support 19 and with the pointer adapted to travel upwardly and downwardly with rotation of the rod 21 it is only necessary for the operator to note the position of the arm or pointer in the slot to know whether or not the valve is open or closed.

The hand wheel 22, which is provided with a rim 46 carried by arms 47, from a hub 48 is secured on a tapering section 49 at the upper end of the rod 21 with a lock nut 50. It will be understood, however, that a hand wheel of any suitable type or design may be used.

As illustrated in Fig. 4 the thrust washer 23 is formed in two semi-circular halves, being split on a line 51, to facilitate inserting the washer in the housing.

In the modification illustrated in Fig. 5 a coupling 52, similar to the coupling 25 is secured, such as by welding, as shown at the points 53 and 54 to the upper end of a rod 55, similar to the rod 28 and a tongue 56, extended upwardly from the rod 55 provides a recess 57 for a tongue 58 extended from the lower end of the rod or shaft 21. In this design a thrust bearing 59, similar to the thrust bearing 24 is provided between the lower end of the coupling 52 and the upper surface 60 of the thrust washer 61.

In use the housing 10 is dropped through an opening 62 in a deck 63 and the housing is secured in position by welding or the like as indicated at the point 64 and with the housing 10 in position the thrust washer, bearing and coupling are positioned on the flange 12 and the cover plate 13 secured on the flange 11 by the studs 14 and nuts 15, with a gasket 65 over the plate and flange. The rod 21 may then be inserted through the packing gland and cover plate with the tongue 26 on the lower end extending into the recess in one side of the upper end of the rod 28 and with the rod 21 in position the support 19 is mounted on the boss or rim 36 of the cover plate and the hand wheel 22 is secured to the upper end of the rod.

By this means the valve from the stem of which the rod 28 extends may be opened and closed by turning the hand wheel and all possibility of leakage through the parts is substantially eliminated. With the arm or pointer 43 an operator may readily determine whether or not the valve is open or closed and with the pointer at the upper end of the opening 45 the valve will be open as indicated by the legend 66 whereas with the arm in the lower end of the opening the valve will be closed as indicated by the legend 67.

To remove the extension rod 21 and the associated parts it is only necessary to remove the nuts 15 from the studs 14 and the entire cover plate 13 with the support 19 and rod 21 may be removed. The parts may readily be assembled by the same means.

It will be understood that other modifications, within the scope of the appended claims, may be made in the design and arrangement of the parts without departing from the spirit of the invention.

What is claimed is:

1. An extension device comprising a cylindrical housing having an annular flange extended outwardly from the upper end and also an annular flange extended inwardly from the lower edge, a thrust washer positioned in the opening of the annular flange extended inwardly from the lower edge of the housing, a lower rod having a coupling means attached, said lower rod extending through the thrust washer and adapted to extend through a valve stem at a remote point, a cover plate on said housing, a support mounted on the cover plate, and an extension rod having coacting coupling means on the lower end positioned to be operatively connected to the lower rod, a hand wheel on the upper end of the extension rod, and means positioned to travel on the extension rod for indicating open and closed positions of a valve actuated by the extension rod and the lower rod.

2. In a valve stem extension assembly, the combination which comprises a cylindrical housing having an annular flange extended inwardly from the lower edge and an annular flange extended outwardly from the upper edge adapted to be positioned in an opening, a cover plate removably mounted on the flange of the housing, a support removably mounted on the cover plate and having a vertically disposed elongated slot therein, a thrust washer positioned in the lower end of the housing, a lower rod having a coupling means attached on the upper end, said lower rod extending through the thrust washer, an upper rod extending through the cover plate and support and having coupling means on the lower end positioned to coact with the coupling means of the lower rod, a hand wheel on the upper end of the upper rod, a pointer threaded on the upper rod and extended into the slot of the support whereby the pointer travels vertically upon rotation of the upper rod, a packing gland positioned in the cover plate and through which the upper rod extends, and set collars positioned above and below the upper portion of the wall of the support for limiting vertical travel of the lower and upper rods.

References Cited in the file of this patent

UNITED STATES PATENTS

| | | |
|---|---|---|
| 1,338,849 | Adair | May 4, 1920 |
| 1,753,723 | Seiffert | Apr. 8, 1930 |
| 1,754,138 | Agee | Apr. 8, 1930 |
| 1,929,645 | Luders | Oct. 10, 1933 |
| 1,946,319 | Hodgson et al | Feb. 6, 1934 |
| 2,736,608 | Martin | Feb. 28, 1956 |